(12) United States Patent
Latimer

(10) Patent No.: US 8,258,404 B2
(45) Date of Patent: Sep. 4, 2012

(54) INSULATION OF BUSBARS USING INSULATING MEMBERS HAVING CORRUGATED SECTIONS

(75) Inventor: Drew Latimer, Murfreesboro, TN (US)

(73) Assignee: Schneider Electric USA, Inc., Palatine, IL (US)

( * ) Notice: Subject to any disclaimer, the term of this patent is extended or adjusted under 35 U.S.C. 154(b) by 565 days.

(21) Appl. No.: 12/487,801

(22) Filed: Jun. 19, 2009

(65) Prior Publication Data
US 2010/0319958 A1 Dec. 23, 2010

(51) Int. Cl.
*H02G 5/00* (2006.01)
(52) U.S. Cl. ............ 174/149 B; 174/149 R; 174/137 R; 174/72 B; 361/637; 361/675; 361/648
(58) Field of Classification Search .................. 174/68.2, 174/72 B, 71 B, 137 B, 88 B, 70 B, 99 B, 174/129 B, 133 B, 149 B, 110 D, 110 R, 174/137 R, 148, 149 R; 29/825; 439/212, 439/213, 214; 361/675, 715, 600, 611, 637, 361/638, 639, 648, 649
See application file for complete search history.

(56) References Cited

U.S. PATENT DOCUMENTS

| | | | |
|---|---|---|---|
| 2,376,307 A * | 5/1945 | Bosch | 174/129 B |
| 3,088,994 A * | 5/1963 | Cataldo | 174/99 B |
| 3,346,687 A | 10/1967 | Giger, Jr. et al. | |
| 3,710,300 A * | 1/1973 | Koenig et al. | 174/99 B |
| 3,956,574 A | 5/1976 | Weimer | |
| 4,272,646 A | 6/1981 | Carlson | |
| 5,261,830 A | 11/1993 | Jego et al. | |
| 5,705,773 A * | 1/1998 | Smith | 174/88 B |
| 5,828,006 A * | 10/1998 | Graham et al. | 174/99 R |
| 5,854,445 A | 12/1998 | Graham et al. | |

FOREIGN PATENT DOCUMENTS
GB 2298969 A 9/1996

OTHER PUBLICATIONS

Written Opinion corresponding to International Patent Application No. PCT/US2010/058212, European Patent Office, dated May 12, 2011, 4 pages.
International Search Report corresponding to International Patent Application No. PCT/US2010/058212, European Patent Office, dated May 12, 2011, 4 pages.

* cited by examiner

*Primary Examiner* — Angel R Estrada
(74) *Attorney, Agent, or Firm* — Nixon Peabody LLP

(57) ABSTRACT

Busbars of a busway system are insulated so as to minimize or eliminate air gaps between busbars. In an embodiment, an insulating sheath is provided with corrugations in regions corresponding to busbar bends. The corrugations allow the sheath to follow the busbar bends without the need to cut or interrupt the sheath. Busbars may therefore be fully insulated without the need for further insulating materials (e.g., tape). Good thermal contact between busbars throughout their length is achieved, improving heat dissipation and efficiency.

15 Claims, 3 Drawing Sheets

INSULATION OF BUSBARS USING INSULATING MEMBERS HAVING CORRUGATED SECTIONS

FIELD OF THE INVENTION

The present invention relates generally to electrical distribution systems, and in particular, to the insulation of busbars in such systems.

BACKGROUND OF THE INVENTION

Busway electrical distribution systems are well known in the art of electrical distribution. Referring to FIG. 1, busway systems are comprised of a number of field-assembled sections 100 each including a number of individually insulated generally flat electrical conductors or busbars 101A-101D stacked one upon another in close thermal contact as shown and enclosed within an enclosure or housing 110 that provides protection and support for the busbars. Each housing includes a duct top 111 and a duct bottom (not shown) which cover the flat surfaces of the bus bars 101 and two duct sides (e.g., side 113), which cover the edges of the busbars. The duct tops and bottoms 111 can be made of electrically conductive material such as aluminum or copper for carrying the system ground current. The duct sides 113 are generally made of steel formed to provide strength to the housing. The housing structure 110 also performs a heat-sinking or heat-dissipation function. The housing 110 is generally held together by screws and nuts, rivets, or other similar methods.

The width of the housing 110 is determined by the width of the busbars 101 and the number of busbar stacks enclosed within the housing 110. The busbars 101 may be sized to carry at least 100 amperes of current, often thousands of amperes of current. During a short circuit, magnetic forces around the busbars tend to push the busbars 101 away from each other, thereby causing the tops and bottoms 111 to bulge. High short circuits can cause the housing 110 to be pulled apart. To prevent or limit short circuit damage, surge clamps (e.g., 121A and 121B) may be placed across the duct tops and bottoms at each end of the busway section 100 and at predetermined intervals between the ends.

The busway section 100 includes an end portion 120 at which the busbars 101 are curved so as to flare apart, allowing for connection to another busway section.

In such a busway system 100, it is known to insulate the busbars 101 using a polyester film. One such suitable polyester film is the MYLAR™ brand polyester film made by DuPont. In one known arrangement, polyester film is formed into U-shaped sheaths. A first sheath fits around a busbar leaving one edge of the busbar exposed. Two such sheaths are placed over a busbar from opposite sides of the busbar so as to fully enclose and insulate the busbar. The flat portions of the busbar are therefore covered by two layers of polyester film corresponding to the two sheaths.

Where the busbar bends or curves, it has been necessary to cut the side portions of the sheaths in the region of the bend to allow the sheaths to follow the bend. The exposed portions of the busbar are then insulated with insulating tape. In a busway having busbars insulated in this fashion, overlapping layers of polyester film and tape result in gapping between the busbars. For example, assuming a tape thickness of 6 mils, with 50% overlap, an air gap of 24 mils will be present between the busbars of each phase of a busway over a 10 foot length, for example. Air gapping between the busbars significantly and undesirably increases the thermal resistance of the busway and interferes with effective heat dissipation and busway efficiency.

BRIEF SUMMARY OF THE INVENTION

Aspects of the present disclosure are directed to insulation of busbars of a busway system so as to minimize or eliminate air gaps between busbars. In an embodiment, an insulating sheath is provided with corrugations in regions corresponding to busbar bends. The corrugations allow the sheath to follow the busbar bends without the need to cut or interrupt the sheath. Busbars may therefore be fully insulated without the need for further insulating materials (e.g., tape). Good thermal contact between busbars throughout their length is achieved, improving heat dissipation and thermal efficiency.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

DETAILED DESCRIPTION OF THE ILLUSTRATED EMBODIMENTS

Although the invention will be described in connection with certain aspects and/or embodiments, it will be understood that the invention is not limited to those particular aspects and/or embodiments. On the contrary, the invention is intended to cover all alternatives, modifications, and equivalent arrangements as may be included within the spirit and scope of the invention as defined by the appended claims.

Figure 2:
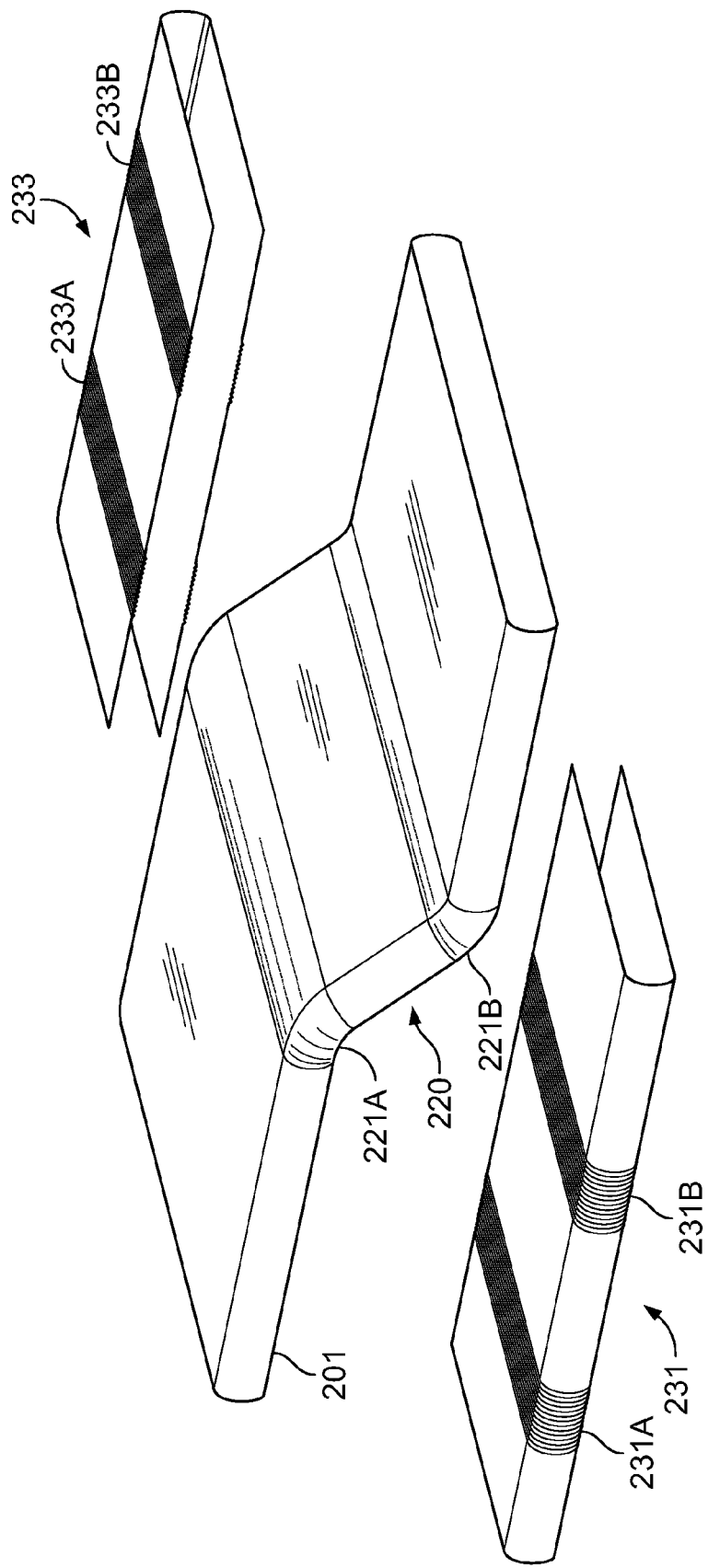
FIG. 2 is a foreshortened view of a section of a busbar including a curved portion and sections of insulating sheaths including corrugated portions used to insulate the busbar.

Referring now to FIG. 2, a perspective view is shown of a section of a busbar 201 including a curved portion 220 having bends 221A and 221B. Also shown are sections of insulating sheaths 231 and 233. The insulating sheaths 231 and 233 include ribbed or corrugated portions (231A, 231B, 233A, 233B) used to insulate the bends 221A and 221B of the busbar 201. In the illustrated embodiment, the insulating sheaths are formed from flexible polyester film. One such suitable polyester film is the MYLAR™ brand polyester film made by DuPont. In the illustrated embodiment, the polyester film is formed into U-shaped sheaths 231 and 233. A first sheath fits around the busbar 201 with one edge of the busbar 201 being exposed. Two such sheaths are placed over the busbar 201 in overlapping fashion from opposite sides so as to fully enclose and insulate a majority of the busbar 201. The flat portions of the busbar 201 are therefore covered by two layers of polyester film corresponding to the two overlapping sheaths 231 and 233.

In the illustrated embodiment, the insulating sheaths 231 and 233 are provided with corrugations (231A, 231B, 233A, 233B) in regions corresponding to busbar bends 221A and 221B. The corrugations (231A, 231B, 233A, 233B) may be added to flat polyester film material prior to its being formed into U-shaped sheaths 231 and 233. The corrugations (231A, 231B, 233A, 233B) allow the sheaths 231 and 233 to follow the busbar bends 221A and 221B without the need to cut or interrupt the sheath. Busbars may therefore be fully insulated without the need for further insulating materials (e.g., tape). Close thermal contact between busbars is achieved, improving heat dissipation and efficiency. "Close thermal contact" is defined herein to mean that for two stacked busbars having facing flat sections, portions of insulating sheaths covering different ones of the facing flat sections of the busbars are in contact with each other throughout a majority of a surface area of the facing flat sections such that there is no airgap or almost no airgap between flat sections of adjacent surfaces of the stacked busbars. Advantageously, the heat rise of the busbars can be significantly reduced compared to that of prior-art tape-wrapped busbars. By eliminating airgaps between adjacent busbars, an efficient thermal conduction path from the busbars to the enclosure is created, reducing the temperature of the busbars and reducing material cost. In other words, the thermal efficiency achieved by eliminating the airgaps may allow the busbars to be of reduced size.

Figure 3:
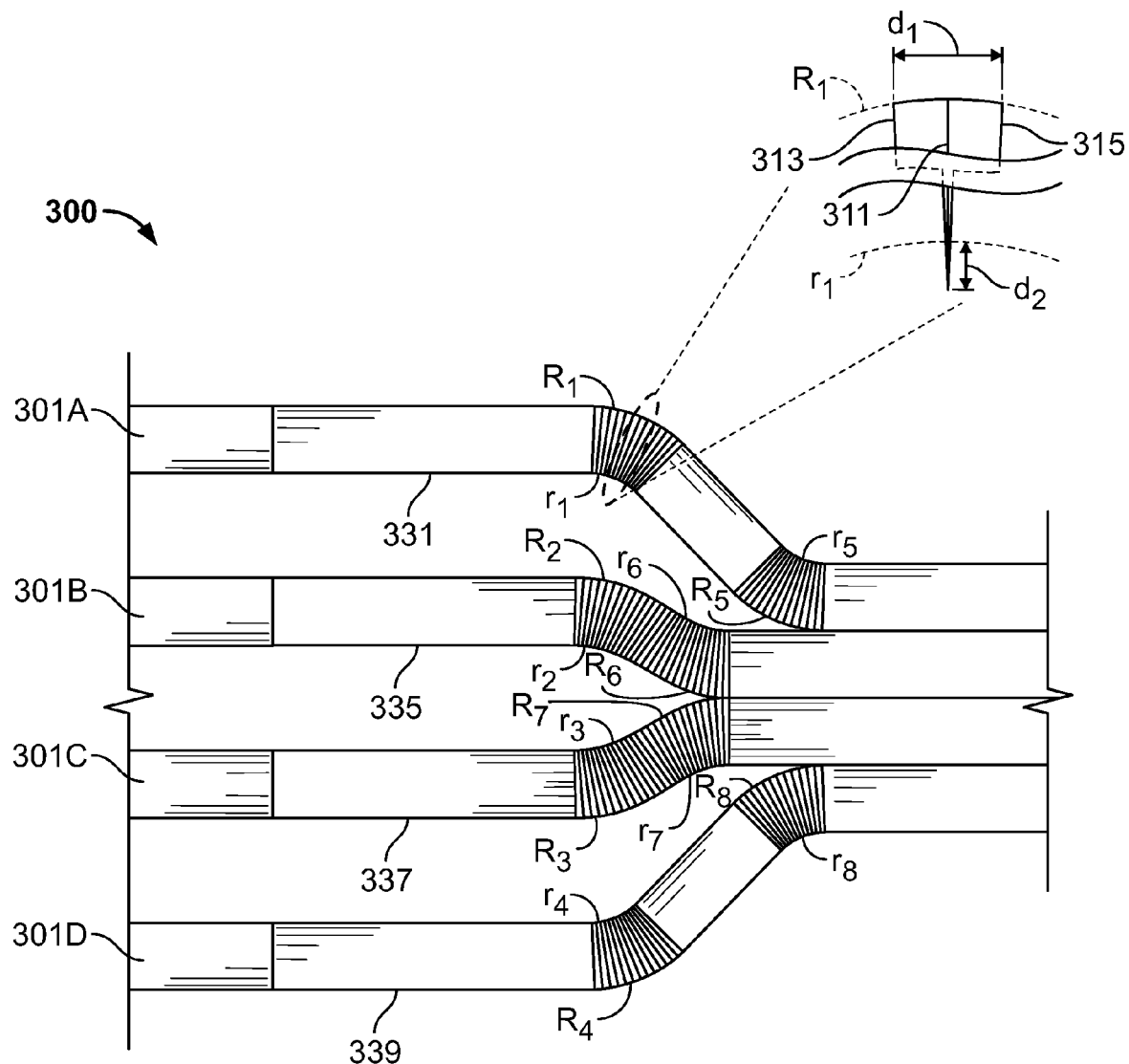
FIG. 3 is a side perspective view of a portion of a busway system with busbars insulated using corrugated sheaths.

Referring to FIG. 3, a side perspective view is shown of a portion of a four-phase busway system 300 with four busbars 301A-301D insulated using corrugated sheaths including sheaths 331, 335, 337 and 339, each like the sheaths described above in connection with FIG. 2. These sheaths are paired with corresponding sheaths applied from the other side of the busbar 301. Corrugations of paired sheaths nest together. At inside radii such as radii $r_1$-$r_8$, the corrugations are compressed together. At outside radii such as radii $R_1$-$R_8$, the corrugations are spread apart and flattened. Note that in the busway system 300 of FIG. 3, no inside radius of any busbar 301 comes into contact with any other busbar 301. Therefore, additional thickness at inside radii as a result of the corrugations does not result in air gapping between the busbars and has no adverse effect on thermal performance. At outside radii, where busbars do contact each other, the corrugations of the polyester film become flattened in order to accommodate the bend. Because they are flattened, they add no additional thickness between busbars. Therefore, air gaps are eliminated.

A greatly enlarged view of a small portion of the corrugations of $R_1$ and $r_1$ is shown to illustrate in further detail the flattening of the corrugations around outside radii, which may not otherwise be readily apparent. A single corrugation is shown having a center line 311, corresponding to a peak, flanked on either side by lines 313 and 315 corresponding to valleys. At the outside radius $R_1$, the corrugation is flattened and hugs the contour of the busbar over an approximate distance d1 (which may be a few millimeters, for example). At the inside radius $r_1$, the corrugation is compressed together and protrudes slightly from the contour of the busbar by an approximate distance d2. Again, because inside radii are spaced apart from adjoining busbars, this slight protrusion is of no consequence and does not result in undesirable air gapping. The relationship between d1:d2 can be in the range of 1:2 to 1:10, depending upon the dimensions of the radii.

Figure 1:
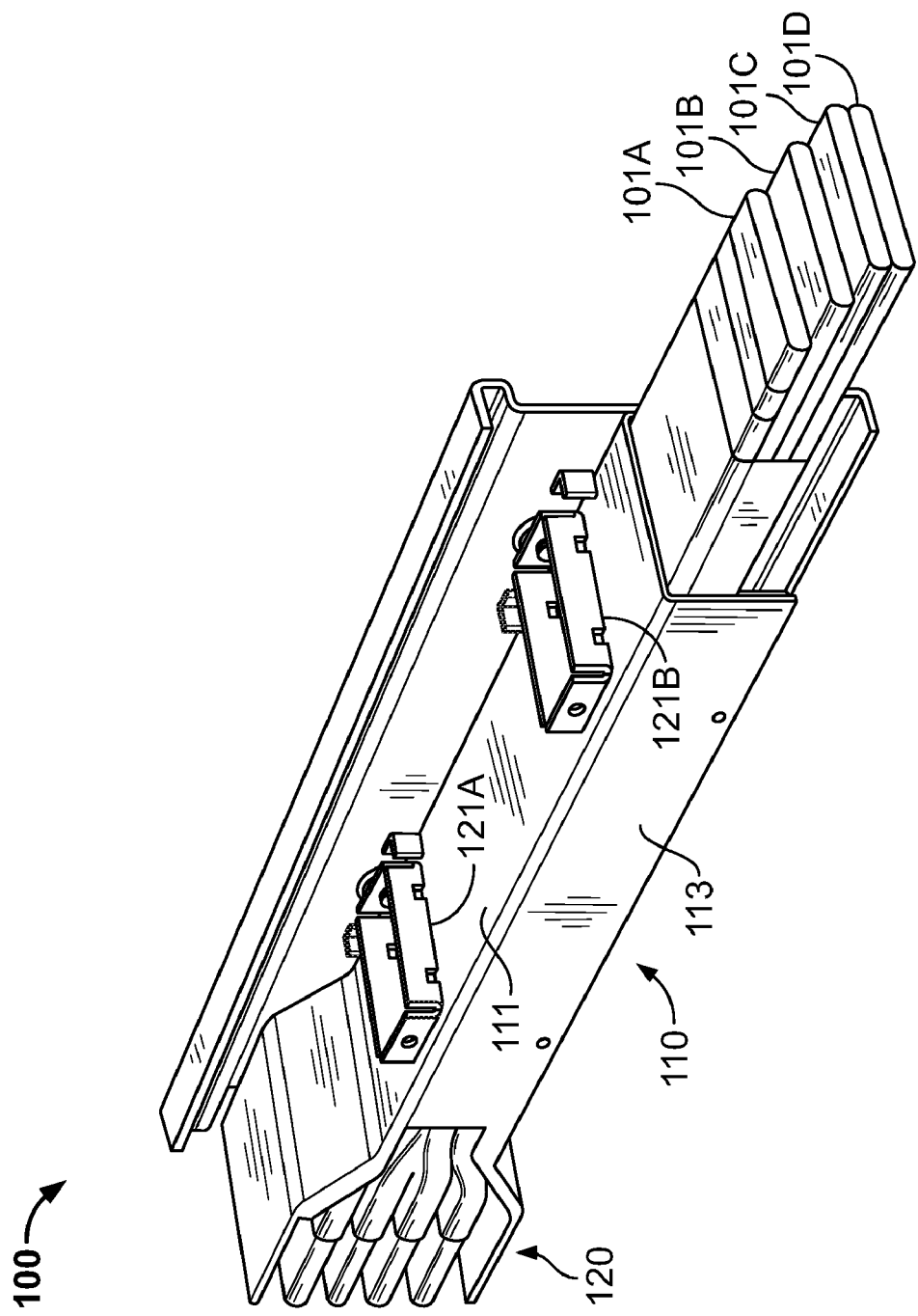
FIG. 1 is a perspective view of a known busway system.

Busbars insulated in the manner of FIG. 3 may be used in electrical distribution equipment of various kinds, including busways like those of FIG. 1. The busbars can be sized to carry at least 100 amperes of electrical current.

The insulating sheaths may be formed of any of a variety of insulating materials including those commonly used in electrical distribution equipment, such as switchboards, panelboards, motor control centers, switchgear, or any other equipment that requires insulated busbars. Furthermore, the insulating sheaths may take on any of a variety of different shapes and configurations.

While particular aspects, embodiments, and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. An insulating sheath for insulating an electrical busbar, the busbar having a curved portion that includes a bend, the insulating sheath comprising at least one corrugated portion having corrugations, the corrugated portion allowing the insulating sheath to follow a curve of the bend in the busbar when applied to the busbar.

2. The insulating sheath of claim 1, wherein the insulating sheath is flexible.

3. The insulating sheath of claim 1, wherein the corrugations are configured such that when the insulating sheath is placed on the busbar with the corrugated portion overlying the bend of the curved portion of the busbar, corrugations of the corrugated portion flatten out along outside radii of the curved portion and bunch together along inside radii of the curved portion.

4. The insulating sheath of claim 3, wherein the insulating sheath is flexible.

5. The insulating sheath of claim 1, wherein the insulating sheath is formed of polyester film.

6. The insulating sheath of claim 1, wherein the insulating sheath has a U-shaped cross section.

7. Electrical distribution equipment comprising:
   a busbar having a curved portion that includes a bend; and
   an insulating sheath applied to the busbar, the insulating sheath having a corrugated portion allowing the insulating sheath to follow a curve of the bend in the busbar.

8. The electrical distribution equipment of claim 7, wherein:
   the busbar is a plurality of busbars each having a curved portion that includes a bend, the plurality of busbars including adjoining busbars; and
   the insulating sheath is a plurality of insulating sheaths, at least one of the insulating sheaths applied to each of the busbars, each of the insulating sheaths having a corrugated portion allowing the insulating sheath to follow a curve of the bend in the busbar to which the insulating sheath is applied.

9. The electrical distribution equipment of claim 8, wherein each of the plurality of busbars is sized to carry at least 100 amperes of electrical current.

10. The electrical distribution equipment of claim 8, wherein the plurality of busbars are stacked such that along a section thereof each of the plurality of busbars is in close thermal contact with an adjoining busbar.

11. The electrical distribution equipment of claim 7, further comprising a second insulating sheath, wherein the insulating sheath and the second insulating sheath are applied to the same section of busbar, the second insulating sheath comprising a corrugated portion.

12. The busway of claim 11, wherein the insulating sheath and the second insulating sheath are applied overlapping each other such that a majority of a surface of the busbar is covered by both of the insulating sheaths.

13. A method of insulating an electrical busbar having a curved portion that includes a bend, comprising applying an insulating sheath to the electrical busbar, the insulating sheath comprising a corrugated portion, the corrugated portion allowing the insulating sheath to follow a curve of the bend in the busbar when applied to the busbar.

14. The method of claim 13, comprising applying two insulating sheaths to the same section of busbar, each insulating sheath comprising at least one corrugated portion.

15. The method of claim 14, wherein the two insulating sheaths are applied overlapping each other such that a majority of a surface of the busbar is covered by both of the two insulating sheaths.

* * * * *